United States Patent
Ueno et al.

(10) Patent No.: US 7,720,297 B2
(45) Date of Patent: May 18, 2010

(54) IMAGE CODING APPARATUS

(75) Inventors: Ikuro Ueno, Tokyo (JP); Ryuta Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 938 days.

(21) Appl. No.: 11/508,218

(22) Filed: Aug. 23, 2006

(65) Prior Publication Data

US 2007/0230803 A1 Oct. 4, 2007

(30) Foreign Application Priority Data

Mar. 30, 2006 (JP) ............... 2006-093389

(51) Int. Cl.
*G06K 9/36* (2006.01)
*G06K 9/46* (2006.01)

(52) U.S. Cl. .................................. 382/239

(58) Field of Classification Search ............. None
See application file for complete search history.

(56) References Cited

U.S. PATENT DOCUMENTS

| 7,280,597 | B2 * | 10/2007 | Zhang et al. | 375/240.16 |
| 7,463,780 | B2 * | 12/2008 | Fukuhara et al. | 382/240 |
| 7,512,281 | B2 * | 3/2009 | Kadowaki | 382/240 |
| 7,539,345 | B2 * | 5/2009 | Kadowaki | 382/232 |
| 2005/0084169 | A1 * | 4/2005 | Kadowaki | 382/240 |

FOREIGN PATENT DOCUMENTS

| JP | A-9-252477 A | 9/1997 |
| JP | 10-108179 A | 4/1998 |
| JP | 2003-230162 A | 8/2003 |
| JP | 2005-109917 A | 4/2005 |
| JP | 2005-303362 A | 10/2005 |
| WO | WO-2005/112427 A1 | 11/2005 |

OTHER PUBLICATIONS

Takahashi et al , English Translation of JP Application No. 2003-341203, Publication No. 2005-109917, cited by IDS, the English Translation is obtained from JPO, publication date: Apr. 21, 2005.*
ISO/IEC 15444-1:2002 ANNEX J.14.3 pp. 209-214.

* cited by examiner

*Primary Examiner*—Yuzhen Ge
(74) *Attorney, Agent, or Firm*—Birch, Stewart, Kolasch & Birch, LLP

(57) ABSTRACT

An image coding apparatus includes: an entropy coding unit for outputting code data based on control information for every coding pass; a rate control information extracting unit for judging both a continuation and an end of the coding pass based on a calculation result of a distortion and a code amount, which are required in a rate control; and a unit for extracting the code data up to the coding end pass based on control information. The rate control information extracting unit includes: calculation units for calculating both a distortion and a code amount produced by coding each of the coding passes; another calculation unit for calculating a slope based on a relationship between the distortion and the code amount, and a coding pass conducting unit for outputting control information based on a slope, a total code amount of all components, and a total code amount of a specific component.

6 Claims, 11 Drawing Sheets

FIG. 3

| 2LL | 2HL | 1HL |
|---|---|---|
| 2LH | 2HH | |
| 1LH | | 1HH |

FIG. 4A
| 12 | 5 | 4 | 15 |
|----|---|----|----|
| 7 | 1 | -5 | 2 |
| -2 | 9 | 11 | -1 |
| 1 | 6 | -8 | -1 |
FIG. 4B
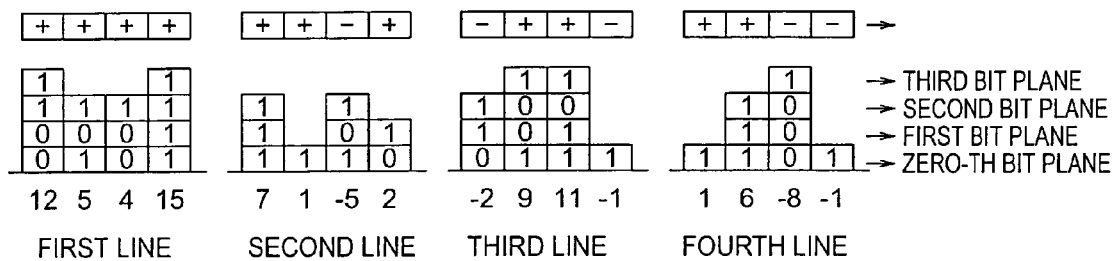
FIG. 4C
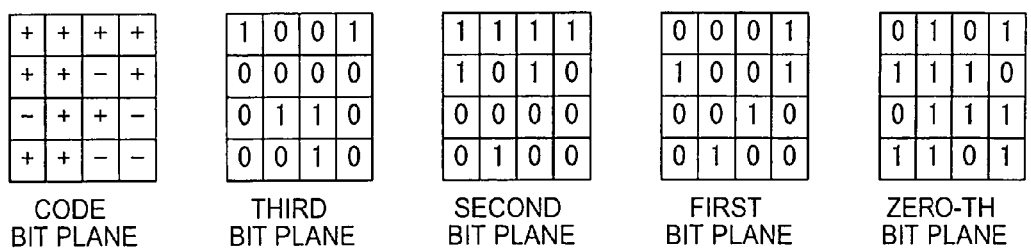

FIG. 8

| λ -1 | R0 | R1 | R2 | Rsum |
|---|---|---|---|---|
| | SPECIFIC COMPONENT | OTHER COMPONENTS | | |
| 100 | 35 | 10 | 10 | 55 |
| 90 | 37 | 12 | 13 | 62 |
| 80 | 39 | 15 | 15 | 69 |
| 70 | 39 | 20 | 20 | 79 |
| 60 | 39 | 30 | 30 | 99 |

FIG. 12

| $\lambda$ -1 | | R0 | R1 | R2 | Rsum |
|---|---|---|---|---|---|
| SPECIFIC COMPONENT | OTHER COMPONENTS | SPECIFIC COMPONENT | OTHER COMPONENTS | | |
| 100 | | 15 | 35 | 35 | 85 |
| 90 | | 17 | 37 | 38 | 92 |
| 80 | | 20 | 39 | 40 | 99 |
| 80 | 80 | 22 | 39 | 40 | 101 |
| 70 | 80 | 25 | 39 | 40 | 104 |
| 60 | 80 | 31 | 39 | 40 | 110 |
| 60 | 80 | 31 | 38 | 39 | 108 |
| 60 | 90 | 31 | 36 | 37 | 104 |
| 60 | 100 | 31 | 34 | 34 | 99 |

IMAGE CODING APPARATUS

BACKGROUND OF THE INVENTION

1. Field of the Invention

The present invention relates to an image coding apparatus capable of controlling rates such that a coding amount distribution to a specific component within a frame is restricted to be equal to or larger than a designated lower limit value, or restricted to be equal to or smaller than a designated upper limit value.

2. Description of the Related Art

Presently, the still image coding algorithm "JPEG" has been widely popularized while being used on the Internet. On the other hand, various needs of further improvements in performance and of further adding of functions are made as coding systems in the next generation. Under these circumstances, the JPEG2000 project newly started in 1997 by the joint institution between ISO and ITU. In December of 2000, the major technical content as to the part 1 was finalized. The part 1 defined the basic system for the JPEG2000 algorithm. The basic system for the JPEG2000 coding algorithm will now be summarized in accordance with the recommendation (ISO/IEC 15444-1:2000).

That is, first, an input image signal is processed by two-dimensional wavelet transformation by a wavelet transforming unit so as to be band-split into a plurality of sub-bands. In this case, the two-dimensional wavelet transformation is realized by combining one-dimensional wavelet transformation with each other. In other words, this two-dimensional wavelet transformation may be realized by combining a process operation in which one-dimensional wavelet transformation of a vertical direction is sequentially performed for every column with another process operation in which one-dimensional wavelet transformation of a horizontal direction is sequentially performed for every line. In this case, one-dimensional wavelet transformation is arranged by a low-pass filter having a predetermined characteristic, a high-pass filter having a preselected characteristic, and a down sampler.

Two-dimensional wavelet transforming coefficients which are produced in the above-explained manner are expressed as LL, HL, LH, and HH, since a low band component is represented as "L", a high band component is represented as "H", transformation along the horizontal direction is expressed by a first character, and transformation along the vertical sub-scanning direction is expressed as a second character. These band-split components are called as sub-bands. In this case, as to the low band component (LL component) along the horizontal direction and the low band component (LL component) along the vertical direction, the wavelet transforming operations are carried out in a recursive manner. Times of the respective wavelet transforming operations executed in the recursive manner will be referred to as "resolution levels", and these resolution levels are described in front of the two-dimensional wavelet transforming coefficients LL, HL, LH, and HH. That is to say, in such a case that a resolution time of wavelet transformation is 2, a resolution level of a minimum resolution component becomes 2, and to the contrary, resolution levels for maximum resolution components of HL, LH, and HH become 1.

Next, a wavelet transforming coefficient in the respective sub-bands is quantized based on a quantizing step size which has been set for each of the sub-bands.

Next, a wavelet transforming coefficient of each of the sub-bands, which has been quantized, is split into regions having fixed sizes, which are called as "code blocks". Thereafter, the code blocks made of multi-value data are converted in binary bit plane representations, and then, each of the bit planes is split into three sorts of coding passes (in other words, Significant Propagation Decoding Pass, Magnitude Refinement Pass, and Cleanup Pass).

With respect to binary signals which are outputted from the three coding passes, a context modeling operation is carried out and an entropy coding operation is performed for each of these coding passes.

Also, a code amount and distortion information are calculated for each of the coding passes in each of the code blocks in conjunction with the entropy coding process operation.

Finally, while deteriorations (distortions) in image qualities are minimized by employing the Lagrange's method of multipliers, a rate control operation is executed by which a code amount is adjusted to become equal to or smaller than a target code size.

Since a method for realizing the rate control operation is not standardized, an arbitrary method may be employed in correspondence with an application program. A brief explanation is made of the mechanism of the rate control unit which is described in the recommendation (ISO/ITU 15444-1:2000) J.14.3 as reference information.

In this rate control method, when a cut down point in each code block "i" is assumed as "ni"; a code amount up to each cut down point is assumed as "R(i, ni)"; and a distortion up to each cut down point is assumed as "D(i, ni)", a variable "$\lambda$" is adjusted by using the Lagrange's method of multipliers until it can satisfy such a condition that a total code amount "R" within an entire screen is located within a range of a target code amount "Rmax", and the total code amount "R" is produced by a cut down point capable of maximizing the below-mentioned formula (1):

$$\Sigma(R(i, ni) - \lambda D(i, ni)) \tag{1}$$

In this case, a distortion implies that how degree a mean square error of a reproduced image when code data up to a certain coding pass are transmitted is decreased, as compared with a mean square error of the reproduced image when the code data up to the certain coding pass are not transmitted. Strictly speaking, the distortion implies a decreased amount of the distortion. As a consequence, the distortion "D" is 0 before the coding operation is performed, and when the code data are coded up to the final bit plane, the distortion "D" becomes equal to the means square error.

A way of finding such a cut down point that the above-explained formula (1) becomes maximum is equivalent to such a way that when the code amount "R" and the distortion "D" of each of the code blocks are represented as an RD curve in a graph, such a cut down point that a slope of a tangential line becomes "$\lambda^{-1}$" is found out. In a case where in two code blocks "c1" and "c2", the cut down points by which the slope of the tangential line becomes "$\lambda^{-1}$" are "nc1" and "nc2", and the code amounts up to these cut down points are "R(c1, nc1)" and "R(c2, nc2)", such "Rs" are added to each other with respect to all of these code blocks, and then, the added "R" is compared with "Rmax". In a case where this is viewed for each of the code blocks, such a cut down point "ni" capable of maximizing $(R(i, ni) - \lambda D(i, ni))$ is required to be found out.

```
Set ni = 0
For k = 1, 2, 3, ...
    Set  ΔR(i, k) = R(i, k) − R(i, ni)
         and  ΔD(i, k) = D(i, k) − D(i, ni)
    If (ΔD(i, k)/ΔR(i, k))>λ⁻¹ then set ni = k
```

However, in this algorithm, if the above-explained process operation is not carried out with respect to a large number of the variables "λ", then the cut down point "ni" cannot be acquired. To this end, a slope "S(i, k)=ΔD(i, k)/ΔR(i, k)" is previously corrected so that this slope is decreased in a monotone manner as to "k". Concretely speaking, the below-mentioned process operation is carried out:

---

(1) Set Ni = {n} (i.e. the set of all truncation point)
(2) Set p = 0
(3) For k = 1, 2, 3, ..., kmax
    If k belongs to Ni
        Set ΔR(i, k) = R(i, k) − R(i, p),
        and ΔD(i, k) = D(i, k) − D(i, p)
        Set S(i, k) = ΔD(i, k)/ΔR(i, k)
        If p≠0 and S(i, k)>S(i, p),
            then remove p from Ni, and go to step (2)
        Otherwise, set p = k

---

In accordance with the process operation, the cut down point with respect to the given variable "λ" may be optimized by the maximum "k" in Ni capable of S(i, k)>$\lambda^{-1}$.

After the conducting operations for the above-explained plural information have been accomplished with respect to all of the code blocks, such a coding data which becomes the target code amount "Rmax" is formed. Concretely speaking, such a variable "λ" is found out which gives a maximum total code amount "Rsum" capable of satisfying "Rsum≦Rmax" with respect to a total code amount Rsum for a certain variable "λ". In this case, a total code amount with respect to a certain variable "λ" may be grasped for the first time by that cut down points in the respective code blocks are exclusively acquired, and code data up to these cut down points are totalized. As a consequence, in order to find out the variable "λ" for giving the maximum "Rsum" capable of Rsum≦Rmax, normally, a total code amount for plural candidates as to the variable "λ" is calculated, and then, such a variable "λ" for giving a total code amount approximated to a desirable value is calculated by a convergence calculation. When the variable "λ" is obtained, code data up to the cut down point corresponding to this variable "λ" is collected from all of the code blocks; a coding pass number in each of the code blocks is furthermore added thereto as additional information; and then, final code data is constructed. As previously explained, the code data capable of minimizing the distortion can be produced based on the target code amount "Rmax".

The above-described international standard specification of JPEG2000 can be acquired via the standardizing organization such as ISO and ITU-T. Also, the latest information as to JPEG2000 may be acquired by referring to the Internet address of http://www.jpeg.org.

As this sort of image coding apparatus, even in a case where a total code amount exceeds over a constant amount, such an image coding apparatus can uniformly distribute the code amounts to the respective blocks (refer to, for example, JP 09-252477 A).

Also, another image coding apparatus is capable of appropriately distributing a code amount for each of frames by solving a local shortage of code distribution amounts, since an additional code amount distribution is considered which does not depend upon a quantizing width (refer to, for instance, JP 10-108179 A).

Also, another image coding apparatus determines a code amount distribution by utilizing a frequency characteristic (refer to, for example, JP 2003-230162 A).

Another image coding apparatus calculates target information amounts of respective coding methods and distributes the calculated target information amounts so that information amounts produced by coding an I picture, a P picture, and a B picture may become optimum in view of image qualities in response to a visual characteristic of an image (refer to, for instance, JP 2005-303362 A).

Furthermore, another image coding apparatus is capable of performing a high coding process operation by effectively executing a subtraction process operation for calculating a slope of a code amount distribution (refer to, for example, JP 2005-109917 A).

In the above-described rate control method, since the codes are allocated in such a manner that the coding distortion becomes minimum over the entire screen under a certain total code amount, a major portion of the codes is concentrated to a specific component, depending upon an image. There are some possibilities that a certain sort of decoder is brought into malfunction. Conversely, a code amount of the specific component becomes very small, depending upon an image, and therefore, there are some possibilities that a subjective image quality is partially deteriorated, although such an optimum view point may be obtained, namely, the coding distribution may be minimized over the entire screen.

Also, in a case where the code amount of the specific component is restricted in the above-explained method, after the code amount distribution has been determined by executing the convergence calculation, if the code amount of the specific component is deviated from a range defined from the determined maximum value to the determined minimum value, then the code amount distribution must be again determined by executing the convergence calculation except for the specific component. In a case where plural sets of such specific components are provided, there is a problem that a total number of re-calculating the code amount distribution is further increased, and a calculation amount thereof is increased.

SUMMARY OF THE INVENTION

The present invention has been made to solve the above-explained problems, and therefore, has an object to provide an image coding apparatus operable in such a manner that while a process operation for coding only such a coding pass that a slope thereof is larger than a parameter "$\lambda^{-1}$" in each of code blocks is sequentially carried out by changing a value of a variable "λ", both a coding process operation and a rate control operation are carried out in 1 pass by monitoring a code amount of a specific component, a calculation amount can be reduced, and extreme deviation in code amounts can be avoided.

An image coding apparatus of the present invention includes an entropy coding means for splitting a two-dimensional signal into a plurality of code blocks, for resolving the code blocks to bit planes, for splitting each of the bit planes into one or more pieces of coding passes, and for coding the coding pass based on control information for every coding pass to output code data. Further, the image coding apparatus includes a code memory for storing thereinto the code data outputted from the entropy coding means, a rate control information extracting means for judging both a continuation and an end of the coding pass based on a calculation result of a distortion and a code amount, which are required in a rate control, and a code data extracting means for extracting the code data up to the coding end pass from the code memory based on the control information extracted from the rate control information extracting means, and for outputting the extracted code data as a code stream. In the image coding apparatus, the rate control information extracting means includes a distortion calculating means for calculating a distortion which is produced by coding each of the coding passes, a code amount calculating means for calculating a code amount of each of the coding passes, and a slope calculating means for calculating a slope based on a relationship between a distortion and a code amount in each of the code blocks from both the distortion calculated from the distortion calculating means and the code amount calculated from the code amount calculating means. Further, the rate control information extracting means includes a coding pass conducting means for outputting the control information to both the entropy coding means and the code data extracting means, while the control information controls each of the coding operation based on the slope, a total code amount of all components, and a total code amount of a specific component so that the total code amount of the all components is equal to or smaller than a target code amount, and the total code amount of the specific component is equal to or smaller than a predetermined maximum value.

In accordance with the present invention, while the process operation for coding only such a coding pass that the slope thereof is larger than the parameter "$\lambda^{-1}$" in each of the code blocks is sequentially carried out by changing the value of the variable "$\lambda$", both the coding process operation and the rate control operation are carried out in 1 pass by monitoring the code amount of the specific component, the calculation amount can be reduced, and the extreme deviation in the code amounts can be avoided.

BRIEF DESCRIPTION OF THE DRAWINGS

In the accompanying drawings:

FIG. 3 is a diagram for representing a sub-band when wavelet transformation is carried out up to a resolution level 2 by a wavelet transforming means 101 shown in FIG. 1;

FIGS. 4A to 4C are explanatory diagrams for explaining that bit planes are resolved by an entropy coding means 103 shown in FIG. 1, in which FIG. 4A indicates one example of a 4×4 code block, FIG. 4B indicates one example in which the data shown in FIG. 4A are converted into a 1-bit signal indicative of a positive/negative and representations of absolute values, and then, such expression results that these data are expressed in a binary manner along the longitudinal direction are arranged for each row, and FIG. 4C indicates such bit planes that bits having the same bit numbers are collected with respect to FIG. 4B;

FIG. 8 is an explanatory diagram for explaining coding sequential operations executed in Embodiment 1 of the present invention;

FIG. 12 is an explanatory diagram for explaining coding sequential operations executed in Embodiment 2 of the present invention.

DETAILED DESCRIPTION OF THE PREFERRED EMBODIMENTS

Embodiment 1

An embodiment of the present invention exemplifies a rate control method executed in such a manner that a coding amount of a specific component is limited within a predesignated maximum value while a coding operation is carried out. In this rate control method, a specific component implies that a color component within three color components of RGB is designated, for instance, only an R color component among these color components is designated, and only a minimum resolution component is designated.

Figure 1:
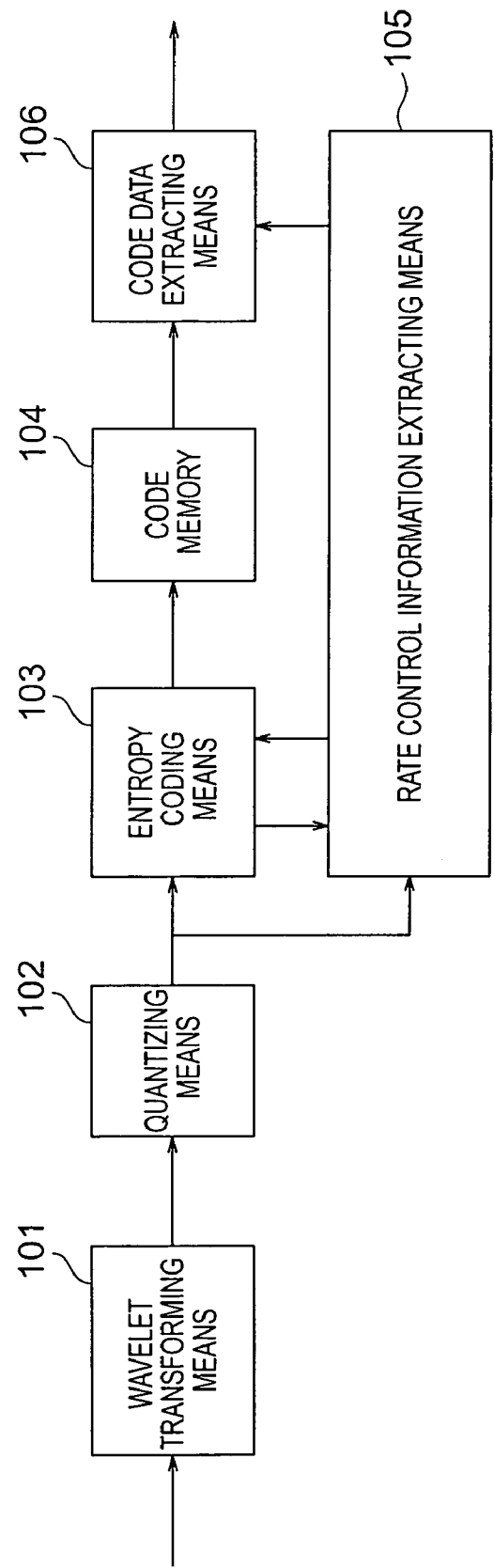
FIG. 1 is a block diagram for showing a configuration of an image coding apparatus according to Embodiment 1 of the present invention.

FIG. 1 is a block diagram showing a configuration of an image coding apparatus according to Embodiment 1 of the present invention. The image coding apparatus indicated in FIG. 1 is provided with a wavelet transforming means 101, a quantizing means 102, an entropy coding means 103, a code memory 104, a rate control information extracting means 105, and a code data extracting means 106. The wavelet transforming means 101 performs a two-dimensional wavelet transforming operation in a recursive manner with respect to an input image signal. The quantizing means 102 quantizes a wavelet transforming coefficient in a preset quantizing step size, which is produced by the wavelet transforming means 101. The entropy coding means 103 resolves the quantized wavelet transforming coefficient to obtain bit planes, and then, binary-arithmetic-codes the bit planes. The code memory 104 temporarily stores thereinto code data which has been entropy-coded. The rate control information extracting means 105 calculates a distortion and a code amount which are required in a rate control, and also judges which pass a coding operation is carried out up to, and which pass the coding operation is accomplished in: The code data extracting means 106 extracts the code data up to a coding operation accomplished pass from the code memory 104 in response to the coding operation accomplished pass outputted from the rate control information extracting means 105, and then, outputs the extracted code data as a code stream.

Figure 2:
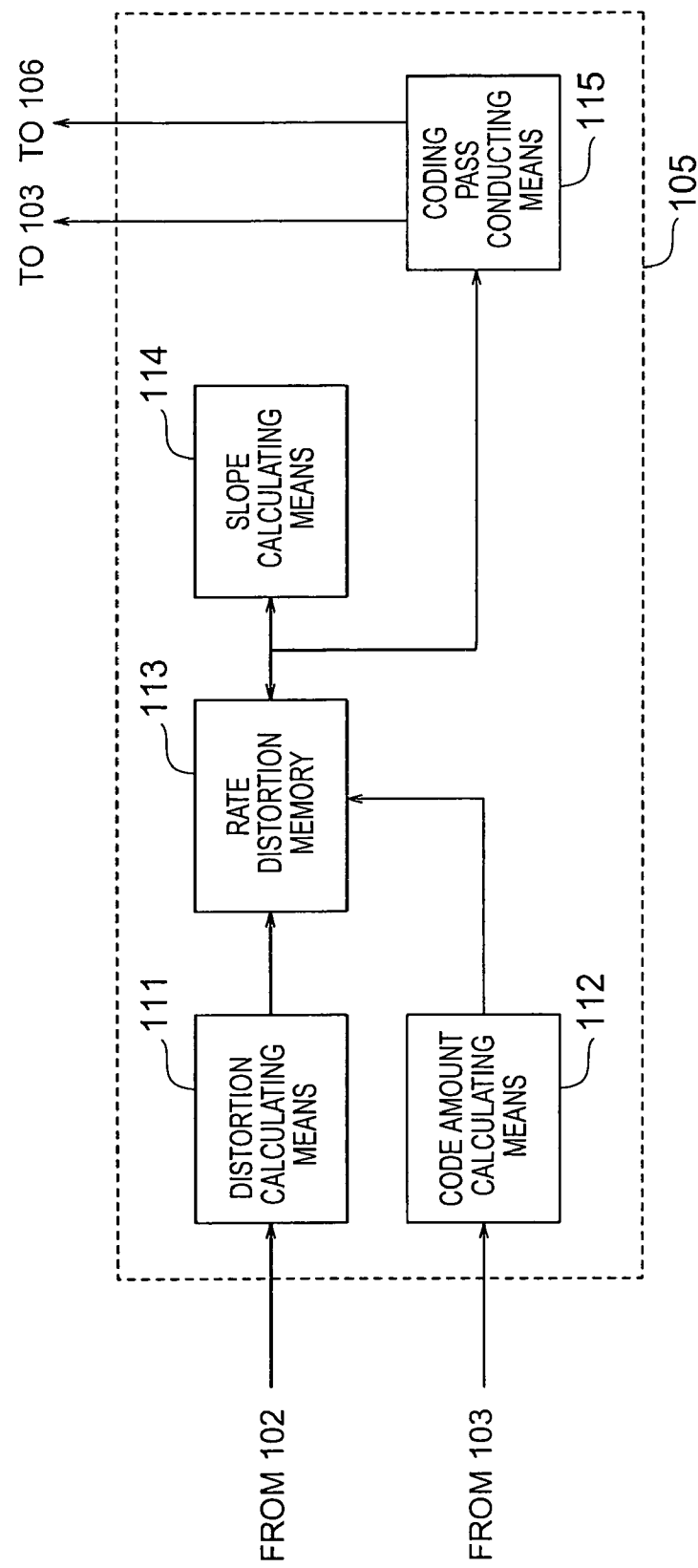
FIG. 2 is a block diagram for indicating a configuration of a rate control information extracting means 105 shown in FIG. 1.

FIG. 2 is a block diagram indicating a configuration of the above-described rate control information extracting means 105 shown in FIG. 1. As indicated in FIG. 2, the rate control information extracting means 105 contains a distortion calculating means 111, a code amount calculating means 112, a rate distortion memory 113, a slope calculating means 114, and a coding pass conducting means 115. The distortion calculating means 111 calculates a distortion for each of the coding passes based on the output from the quantizing means 102. The code amount calculating means 112 counts a code amount for each of the coding passes based on an output from the entropy coding means 103. The rate distortion memory 113 stores thereinto distortion data from the distortion calculating means 111, and both code data amount and a slope thereof which are derived from the code amount calculating means 112 for each of the coding passes. The coding pass conducting means 115 judges as to whether or not a coding operation is continued in a coding pass, and conducts such a coding pass which should be coded, and outputs control information as a conducted result to both the entropy coding means 103 and the code data extracting means 106.

Figure 3:
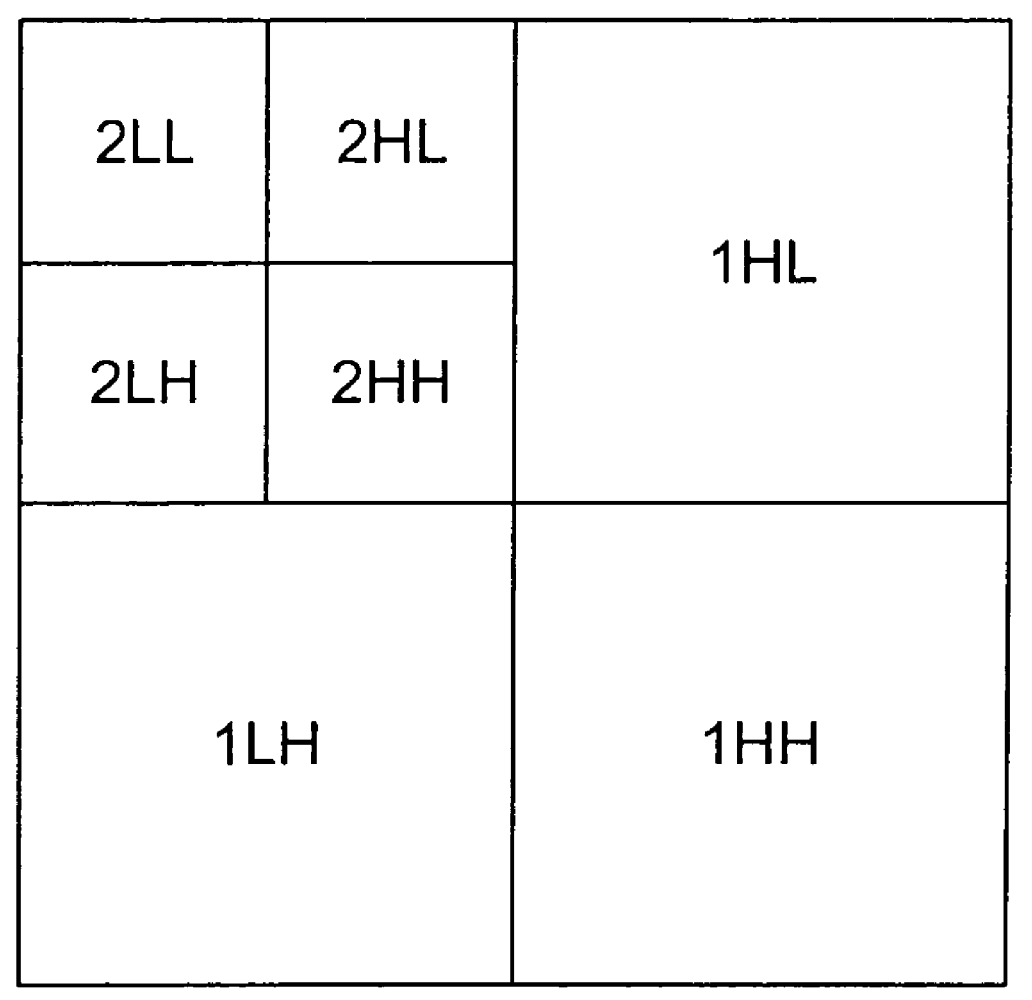

Next, operations of the image coding apparatus will now be described. First, in FIG. 1, for example, an image signal supplied from an image input apparatus (not shown) is processed by the wavelet transforming means 101 so that a one-dimensional wavelet transforming operation is carried out with respect to both a vertical direction and a horizontal direction, namely, a two-dimensional direction, and then, is band-split to sub-bands. The image input apparatus is known as, for example, an image scanner, a digital camera, a network, a storage medium, or the like. In this case, the one-dimensional wavelet transformation is realized by a filter bank constituted by a low-pass filter and a high-pass filter. FIG. 3 represents such an example that a two-dimensional wavelet transformation is being carried out two times in a recursive manner by the wavelet transforming means 101 shown in FIG. 1. In this drawing, a numeral of a head portion indicates resolution levels, and two alphabetical characters of either "L" or "H" which succeed the head numeral indicate sorts of filters for the horizontal direction and the vertical direction. Symbol "L" denotes a low-pass filter, and symbol "H" represents a high-pass filter. Also, an operation that a wavelet transformation is carried out two times in a "recursive manner" implies such an operation that when 1LL, 1HL, 1LH, and 1HH are first produced by performing a first-time wavelet transformation, a second-time wavelet transformation is carried out with respect to the 1LL so as to produce 2LL, 2HL, 2LH, and 2HH.

In the quantizing means 102, the wavelet transforming coefficient is quantized based on a quantizing step size which is set for each of the sub-bands.

In the entropy coding means 103, after the wavelet transforming coefficient of each of the sub-bands is split into rectangular regions having fixed sizes which are called code blocks, each of the code blocks, which is constructed of multi-value data, is converted into a binary bit plane. Normally, a dimension of this code block is set in a size of 64×64, 32×32, or the like.

Now, a detailed explanation as to the resolution of a bit plane is made by employing FIG. 4A to FIG. 4C. FIG. 4A indicates an example of a 4×4 code block. FIG. 4B indicates bit planes in which these data are converted into a 1-bit signal indicative of a positive/negative and representations of absolute values, and then, such expression results that these data are expressed in a binary manner along the longitudinal direction are arranged for each row. FIG. 4C indicates such bit planes that bits having the same bit numbers are collected with respect to FIG. 4B. In this drawing, when the least significant bit (LSB) is a zero-th bit and the most significant bit (MSB) is a third bit, it is assumed that bits which are collected in the zero-th bit are defined as a zero-th bit plane; bits which are collected in the first bit are defined as a first bit plane; bits which are collected in the second bit are defined as a second bit plane; and bits which are collected in the third bit are defined as a third bit plane. In addition to the above-described bit planes, a code bit plane is formed as a collection of bits which indicate positives/negatives.

In the entropy coding means 103, each bit within a bit plane is split into three different sorts of coding passes in response to a context thereof, namely, a significant propagation decoding pass, a magnitude refinement pass, and a cleanup pass.

Next, the entropy coding means 103 performs a context modeling operation for arithmetic coding operation with respect to each of the coding passes. It should be understood that for such bit planes which become "0" when counted from the MSB plane, both a context modeling operation and a coding process operation are not carried out, but a total number of bit planes, all of which become "0", is merely written in a header. Then, as to a bit plane in which "1" first appears, all bits are classified as the cleanup pass, whereas as to other bit planes, as explained above, bits thereof are classified as three sorts of coding passes.

Figure 5:
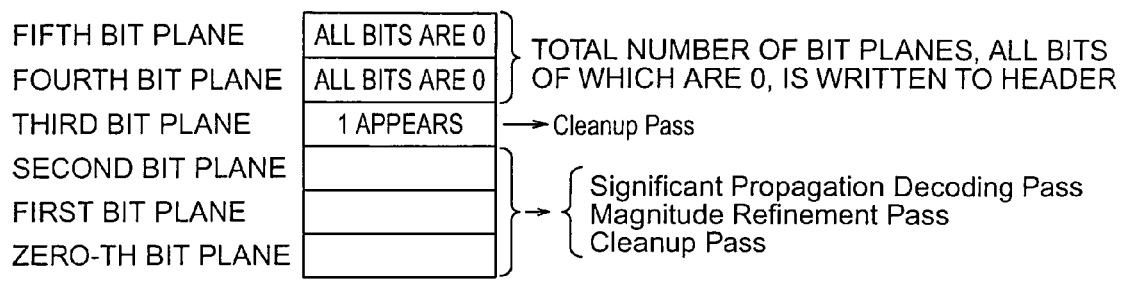
FIG. 5 is an explanatory diagram for explaining that a bit plane is resolved into coding passes by the entropy coding means 103 shown in FIG. 1.

FIG. 5 shows an example in which a total number of bit planes of a code block is "6", and a total number of effective bit planes is "4". When a context modeling operation is ended, an entropy coding process operation by an arithmetic code is carried out.

In conjunction with the entropy coding process operation, the distortion calculating means 111 employed in the rate control information extracting means 105 calculates a difference "$\Delta D$" between a distortion "D" in a certain coded pass and a distortion "D" in a coded pass succeeding the first-mentioned coded pass every time the coding process operation of the certain pass is accomplished in each of the code blocks, and also calculates an accumulated value $D=D+\Delta D$. In this case, a distortion indicates a degree of reduction of a mean square error of a reproduced image when code data up to a certain coding pass are transferred, as compared with such a mean square error when the code data are not transferred. Strictly speaking, this distortion implies a decreased amount of coding distortions. As a consequence, if differences "$\Delta D$" of distortions "D" up to the final bit plane are accumulated, the accumulated difference becomes equal to a mean square error thereof. As to a method of calculating the difference "$\Delta D$", the calculating methods and the like may be employed which are introduced in the recommendation (ISO/ITU 15444-1:2000) Annex J of JPEG 2000.

Also, at the same time when the process operation of the above-described distortion calculating means 111 is carried out, the code amount calculating means 112 calculates an output byte number "$\Delta R$" and an accumulated value thereof $R=R+\Delta R$ in a certain coding pass every time the coding process operation of the certain pass is accomplished in each of the code blocks. After various indexes such as tile numbers, resolution levels, sub-bands, code blocks, coding passes, and the like are applied to these distortions "D" and code data amounts "R", the resulting distortions "D" and code amounts "R" are stored in the rate distortion memory 113.

Figure 6:
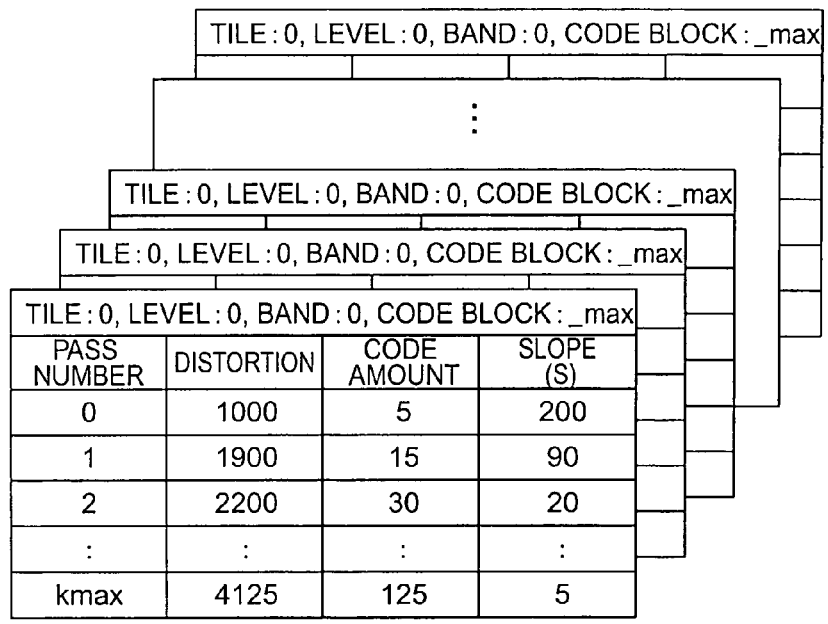
FIG. 6 is a diagram for showing data stored in a rate distortion memory 113 shown in FIG. 2.

Also, the slope calculating means 114 calculates a slope "S" based on the code data amount "R" and the distortion data "D". The calculated slope "S" is stored in a position which is possible to grasp the slope of the coding pass that is the same as that of distortion data and the code data amount with regard to the rate distortion memory 113. As a result, as shown in FIG. 6, data are stored in the rate distortion memory 113.

Further, the coding pass conducting means 115 judges whether or not the coding process operation in this code block is continued up to a further pass based on the slope "S" and a parameter "$\lambda$" (hereinafter, referred to as "rate control parameter"), and then, sends the judgement result to the entropy coding means 103. Also, if a coding subject code block is contained in a specific component and a total code amount of the specific component reaches a designated maximum value, then the coding pass conducting means 115 instructs the entropy coding means 103 so that the coding process operation of this code block is skipped.

If the coding process operation is continued, then the entropy coding means 103 codes the next pass, and in the rate control information extracting means 105, the slope calculating means 114 calculates the slope "S" based on a total output byte number "ΔR" in the coded pass, and a difference "ΔD" of distortions "D", and the coding pass conducting means 115 again judges whether or not the coding process operation is to be continued up to a further pass. If the coding process operation is not continued, then the rate control information extracting means 105 sends information as to a completion of the coding process operation to the entropy coding means 103, and sends the coding operation end pass to the code data extracting means 106. It should be understood that control operations for the coding process operation related to the rate control operation will be explained in detail with employment of a flow chart.

In the code data extracting means 106, code data are read out from the code memory 104 up to a pass which is determined from the coding end pass in each of the code blocks; a total coding pass number contained in each of the code blocks is added as additional information to the read code data; and thereafter, the resultant code data are arrayed in a designated sequence and predetermined header information is added thereto. Then, the resulting code data are outputted as a code stream.

In this connection, a detailed explanation is made of process operations executed in the rate control information extracting means 105 and the entropy coding means 103. In this processing method, while a plurality of candidates for the rate control parameter "λ" are previously prepared, the coding process operation is carried out with respect to all of the code blocks until a coding pass satisfies a certain parameter "λ". In this case, a judgement is made as to whether or not a code amount reaches a target amount. If the code amount reaches the target amount, then the coding process operation is accomplished. If the code amount does not reach the target amount, then a candidate for the next parameter "λ" is set, and the coding process operation is carried out again until all of the code blocks satisfy this parameter "λ". In this case, not only a total code amount of all of the code blocks, but also a total code amount of code blocks of a predesignated specific component are monitored. In such a case that a code amount of the specific component reaches a predesignated maximum value, it is assumed that a code allocation to the specific component is defined as a maximum value thereof, and thereafter, the code amount to the specific component is not increased. As previously explained, such a process operation that the coding process operation is carried out by gradually changing the parameter "λ" is performed until the total code amount reaches the target amount. A condition as to whether or not a certain rate control parameter "λ" is satisfied is judged by calculating a slope "S" of an RD curve at an end point of each of the passes and by checking whether or not the calculated slope "S" reaches "λ⁻¹".

Figure 7:
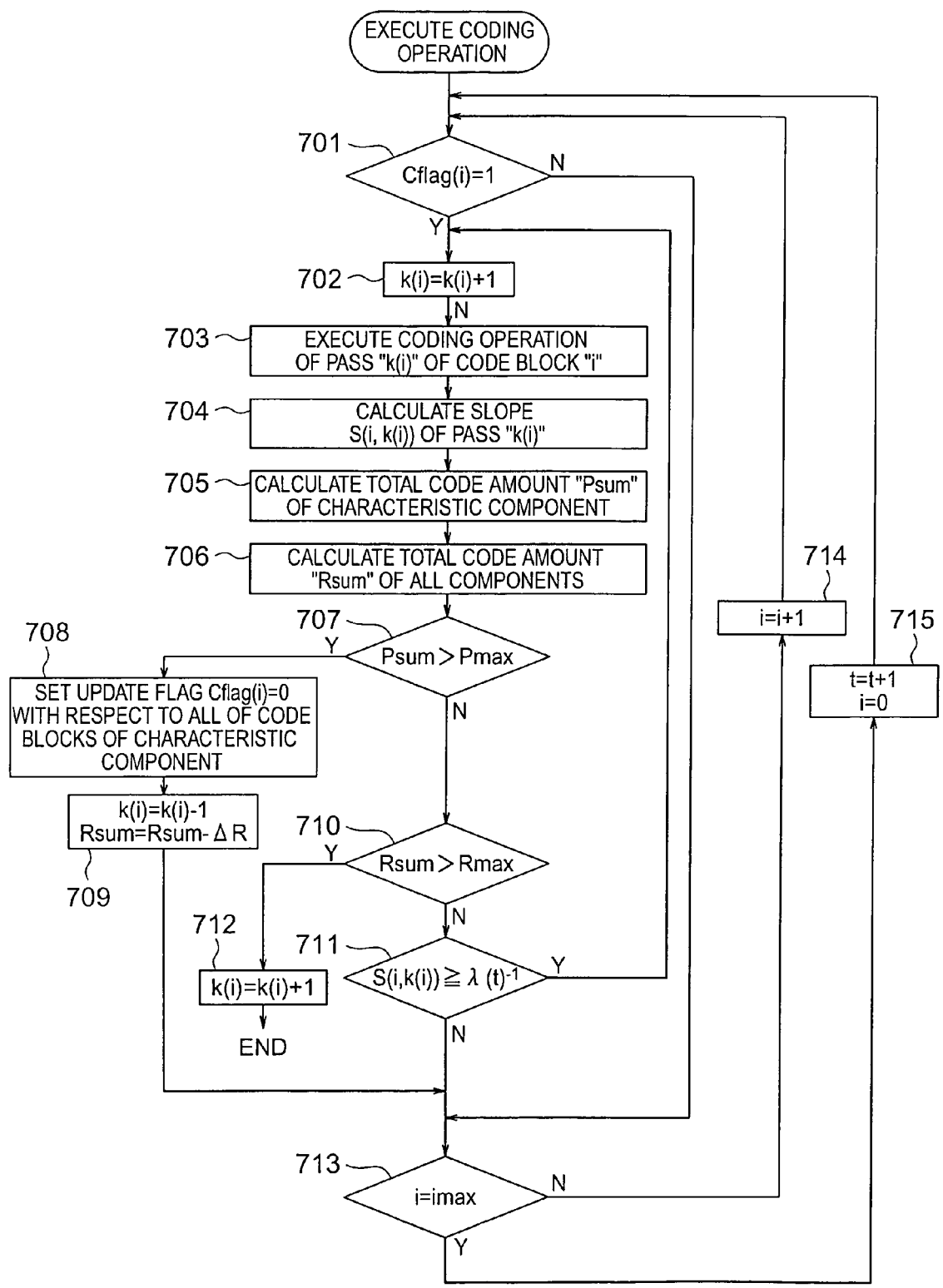
FIG. 7 is a flow chart for indicating process operations of the image coding apparatus according to Embodiment 1 of the present invention.

A method for determining a pass which should be coded will now be explained with reference to a flow chart shown in FIG. 7, which corresponds to the operation contents of the coding pass conducting means 115 within the rate control information extracting means 105. A candidate "λ(t)" for the rate control parameter is previously set as follows:

$$\lambda(t) = \{\lambda(0), \lambda(1), \lambda(2), ..., \lambda(tmax)\}$$
$$(\lambda(t) < \lambda(t+1))$$

Also, an initial value of an index "t" of the rate control parameter "λ" is assumed as t=0 (t=0 to tmax); an index "i" of the code block is assumed as i=0 (i=0 to imax); a counter "Rsum" of a total code amount is assumed as Rsum=0; a counter "Psum" of a total code amount of a specific component is assumed as Psum=0; a variable k(i) for storing a coding pass in each of the code blocks is assumed as k(i)=−1 (index of next pass which has skipped zero bit plane is assumed as 0, k(i)=−1 to kmax, and for the convenience of counter, initial value is assumed as k(i)=−1).

Although this memory is not illustrated in the block diagram, symbol "k(i)" indicates a variable which is stored for each code block; and the index "t" of the rate control parameter, the index "i" of the code block, the counter "Rsum" of the total code amount, and the counter "Psum" of the total code amount are assumed as variables which are commonly used in all of the code blocks.

Also, an update flag for indicating whether or not a coding process operation is further advanced in a certain code block is assumed as Cflag(i)=1 (i=0 to imax). In the beginning, in such a case that the index "t" of the rate control parameter "λ" is incremented in all of the coding blocks and a total code amount of a specific component exceeds the designated maximum value during halfway of the coding process operation, it is assumed that an update flag of a coding block belonging to the specific component is "0", and the coding process operation is not further carried out subsequent to this coding block. It is assumed that the target total code amount "Rmax" and the maximum value "Pmax" of the specific component code amount are previously designated and previously stored in the coding pass conducting means 115.

First, in a step 701, a judgement is made as to whether or not a next coding pass is coded in a code block "i" by using the update flag Cflag(i). In the beginning, the coding process operation is carried out in all of the code blocks. However, after a code amount of a specific component exceeds the designated code amount, it is assumed that the update flag of a code block belonging to the specific component is "0", and the rate control parameter is not further updated. In a step 702, when the update flag Cflag(i) is "1", a coding pass which should be coded is set to "k(i)". In a step 703, the coding pass k(i) of the code block is coded.

After the coding operation is carried out, in a step 704, a slope "S(i, k(i))" of the coding pass k(i) is calculated, while using a relationship between the rates and the distortions which are stored in the rate distortion memory 113 such as the difference "ΔD" of the distortion "D" in this coding pass and that of the previous one which is calculated by the distortion calculating means 111, and also the code amount "ΔR" in the coding pass which is calculated by the code amount calculating means 112.

In a step 705, a total code amount "Psum" of the specific component is calculated. Although not shown in the drawing, information used for judging whether or not the respective code blocks belong to the specific component is stored inside the coding pass conducting means 115. Every time a code block of the specific component is coded, the code amount "ΔR" of the coding pass which is to be a coding target is added to the total code amount "Psum" of the specific component so as to calculate a total code amount of the specific component. In a step 706, the code amount "ΔR" of the coding pass which is to be a coding target is added to the total code amount "Rsum" so as to calculate a total code amount.

Next, in a step 707, the code amount "Psum" of the specific component is compared with a maximum value "Pmax" of the code amount of the specific component. If Psum>Pmax, then the update flags as to all of the code blocks belonging to the specific component are set as Cflag=0, and subsequently, the coding process operation is no longer carried out in the code blocks of the specific component in a step 708. Also, since the code amount "Psum" of the specific component exceeds the maximum value "Pmax" in the coding pass k(i), in order to remove a final coding pass of the present code block, in a step 709, while the index of the final coding pass is set to "k(i)−1", a code amount "ΔR" of the final coding pass is subtracted from the counter of the total code amount.

If Psum≦Pmax, then the coding process operation is continued without updating the update flag. In a step 710, the total code amount "Rsum" is compared with the target total code amount "Rmax". If the total code amount "Rsum" reaches the target total code amount "Rmax", then the coding process operation is ended at this time, and such information "k(i)" for indicating which pass the coding process operation has been performed up to in each of the code blocks is transmitted to the code data extracting means 106. In a step 712, since the code amount Psum exceeds the maximum value "Rmax" in the pass k(i), an index of a final coding pass is defined as k(i)−1 in order to remove the final coding pass of the present code block.

If the total code amount "Rsum" does not reach the target total code amount "Rmax", then the slope S(i, k(i)) in the present coding pass is compared with "λ(t)$^{-1}$" corresponding to a slope threshold value in a step 711. When the slope "S" is larger than the slope threshold value, a next pass is further coded (step 711→step 702). When the slope "S" is smaller than λ(t)$^{-1}$, the code data of the already coded pass is temporarily stored in the memory, the coding process operation of this code block is interrupted, the index "i" of the code block is incremented, and the process operation advances to a coding process operation for a next code block (step 711→step 713→step 714→step 701). Although not indicated in the flow chart, it is assumed that also in such a case that a coding pass is a final coding pass of the code block, the process operation advances to the process operation for the next code block.

Similarly, the coding process operation is carried out also with respect to the next code block until the slope becomes smaller than the slope threshold value of "λ(t)$^{-1}$". After this coding process operations have been carried out with respect to all of the code blocks, the index "t" of the parameter "λ" is incremented, and thus, the slope threshold value "λ(t)$^{-1}$" is decreased. The parameter "λ" is set to a next candidate, and then, the coding process operation is again carried out until the slope becomes smaller than the slope threshold value of "λ(t)$^{-1}$" (step 711→step 713→step 715→step 701). It should be noted that in the step 715, there are some cases where even when the parameter λ(t) is updated, the following relationship is established:

$$S(i, k(i)) < \lambda(t)^{-1}.$$

In other words, the parameter "λ" after being updated becomes larger than the slope in the previously coded pass. In this case, although not shown in the flow chart, the process operation jumps over the steps up to the step 713, and the coding process operation of this block passes, and then advances to the coding process operation for the next code block.

Next, FIG. 8 indicates an example of how the parameter "λ" is changed so as to determine a rate distribution. In this example, a coding process operation is carried out assuming that image data constructed of 3 color components (RGB) is a target value of a total code amount Rmax=100. Total code amounts of the respective R, G, and B color components are assumed as R0, R1, R2, and a maximum value "Pmax" of a code amount of the R component is "40".

First, the coding process operation starts from λ$^{-1}$=100, and is continuously carried out until the slope "S" becomes S<λ$^{-1}$=100 in each of the code blocks. At such a stage that this coding process operation is carried out with respect to all of the code blocks, the total code amount "Rsum" is equal to 55.

Since the total code amount "Rsum" is below the target total code amount "Rmax", the parameter "λ" is decremented by 1 stage, and thus, becomes λ$^{-1}$=90. Again, the coding process operation is continuously carried out until the slope "S" becomes S<λ$^{-1}$=90 in each of the code blocks. At such a stage that this coding process operation is carried out with respect to all of the code blocks, the total code amount "Rsum" is equal to 62.

Since the total code amount "Rsum" is still below the target total code amount "Rmax", when the parameter "λ" is decremented by 1 stage to become λ$^{-1}$=80, a code amount of the R component exceeds the maximum value 40 through halfway. As a result, it is assumed that the coding process operation is not subsequently carried out to the code block belonging to the R component. As to the specific component, a maximum code amount which does not exceed the maximum value of 40 is 39. As to the G component and the B component, the coding process operation is continued, and the coding process operation is continued until the slope "S" satisfies S<λ$^{-1}$=80 in all of the code blocks except for the R component. At a stage where the coding process operation of λ$^{-1}$=80 is accomplished, a total code amount "Rsum" is 69. In this table, numeral values which are unchanged since the updating operation is stopped are indicated by mesh lines.

Since the total code amount "Rsum" is still below the target total code amount "Rmax", the parameter "λ" is changed to the next value "70" for carrying out the coding process operation. Also, in this case, as to the R component, the coding process operation is not further carried out. As to the G component and the B component, the coding process operation is continued until the slope "S" satisfies S<λ$^{-1}$=70 in all of the code blocks. At a stage where the coding process operation of λ$^{-1}$=70 is accomplished, a total code amount "Rsum" is 79.

Even in this stage, the total code amount "Rsum" is still below the target total code amount "Rmax", so the parameter "λ" is changed to the next value of "60" for carrying out the coding process operation. While this coding process operation is executed, since the total code amount "Rsum" reaches Rmax=100, the coding process operation is accomplished at this time. The maximum code amounts which do not exceed the target total code amount "Rmax" are R1=30 and R2=30. Since the above-explained coding process operations are carried out, the code amounts which are allocated to the respective R, G, and B color components are given as 39, 30, 30, and also, the total code amount becomes 99.

In Embodiment 1, the monitoring operation has been performed for monitoring whether or not the code amount of the specific component becomes the maximum code amount so as to restrict the code amount of the specific component. However, the present invention is not necessarily limited to the code amount. Alternatively, for example, a coding distortion of the specific component may be monitored in order that the coding distortion of the specific component is restricted to be equal to or smaller than a designated coding distortion value. Also, in Embodiment 1, the specific component is selected to one sort. Alternatively, a plurality of specific components may be set, and a maximum value of these specific components may be set. For example, in the image data constituted of three color (RGB) components, a total code amount of each of these three color components may be alternatively monitored so as to restrict the total code amounts of the respective three color components.

As previously explained, since the code amount of the specific component is equal to or smaller than the maximum value, a decoding operation can be carried out even by a compact decoder having small amount of resources, thereby reducing cost required for the decoder. Also, in the case where the code amount of the specific component is restricted based on a method for executing a convergence calculation indicated as a conventional technique, if the code amount of the specific component does not reach the minimum value, then the convergence calculation for seeking the proper slope "λ" is again required. In the above-explained conventional convergence calculation, after all of the coding passes are coded, the slope "λ" capable of satisfying the target total code amount is searched by executing the convergence calculation. In contrast to the conventional method, in Embodiment 1, the code amount of the specific component may be merely monitored in order to determine whether or not the coding process operation with respect to each of the coding passes is continued. As a result, the coding method of Embodiment 1 may also have a merit that the coding process amount is reduced.

Embodiment 2

The above-explained Embodiment 1 has represented the method for restricting the code amount of the specific component to become equal to or smaller than the designated maximum value. In Embodiment 2 of the present invention, a description is made of a method for restricting the code amount of the specific component to become equal to or larger than a designated minimum value.

Since a configuration of an image coding apparatus according to Embodiment 2 of the present invention is made similar to that of Embodiment 1 shown in FIG. 1, explanations thereof will be omitted, and also, a detailed explanation is made of process operations executed in the rate control information extracting means 105 and the entropy coding means 103 of FIG. 1. In this method, a plurality of candidates of a rate control parameter "λ" are previously prepared, thereby carrying out coding process operations with respect to all of the code blocks up to a coding pass which satisfies a certain rate control parameter "λ". In this case, a judgement is made as to whether or not a code amount reaches a target amount. If the code amount reaches the target amount, then the coding process operation is accomplished. If the code amount does not reach the target amount, then a candidate for a next parameter "λ" is set, and the coding process operation is again carried out until all of the code blocks can satisfy the parameter "λ".

Here, a judgement is made as to whether or not a total code amount of a specific component exceeds a predesignated minimum value after the total code amount has reached the target value, and if the total code amount of the specific component becomes equal to or larger than the minimum value, then the coding process operation is ended. If the total code amount of the specific component becomes equal to or smaller than the minimum value, then the coding process operation is carried out only to code blocks belonging to the specific component until the code amount exceeds the minimum value. The allocation of the code amount to the specific component is accomplished at this stage.

Next, with respect to code blocks other than those belonging to the specific component, a value of the parameter "λ" is set in an order opposite to the above-explained order (in other words, so that parameter "λ" becomes small), and code data up to a coding pass having a slope which exceeds "λ$^{-1}$" is assumed as code data of this coding block. A process operation for sequentially lowering these parameters "λ" is carried out until the total code amount becomes smaller than the target total code amount.

Figure 9:
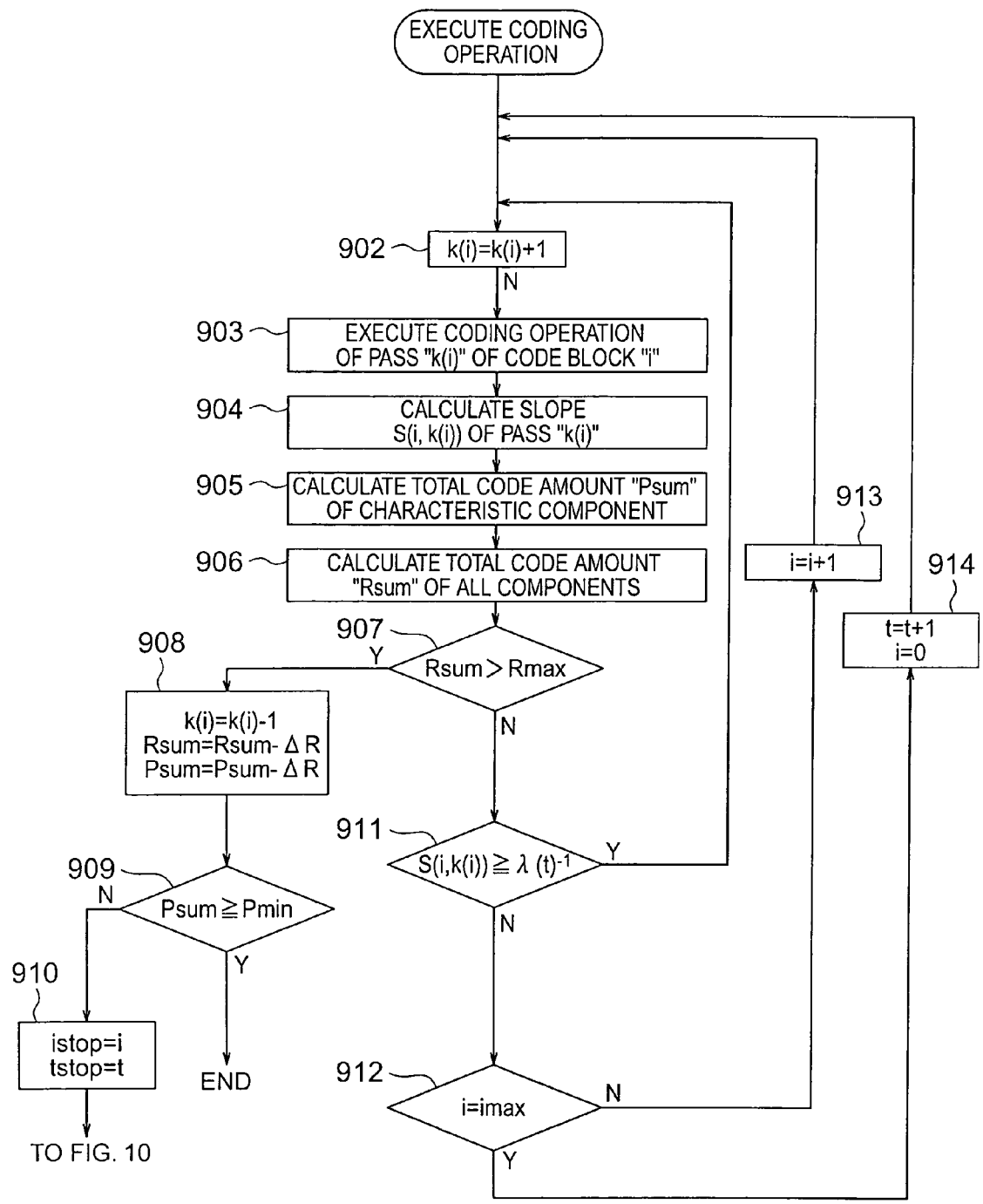
FIG. 9 is a flow chart for representing process operations of an image coding apparatus according to Embodiment 2 of the present invention.
Figure 10:
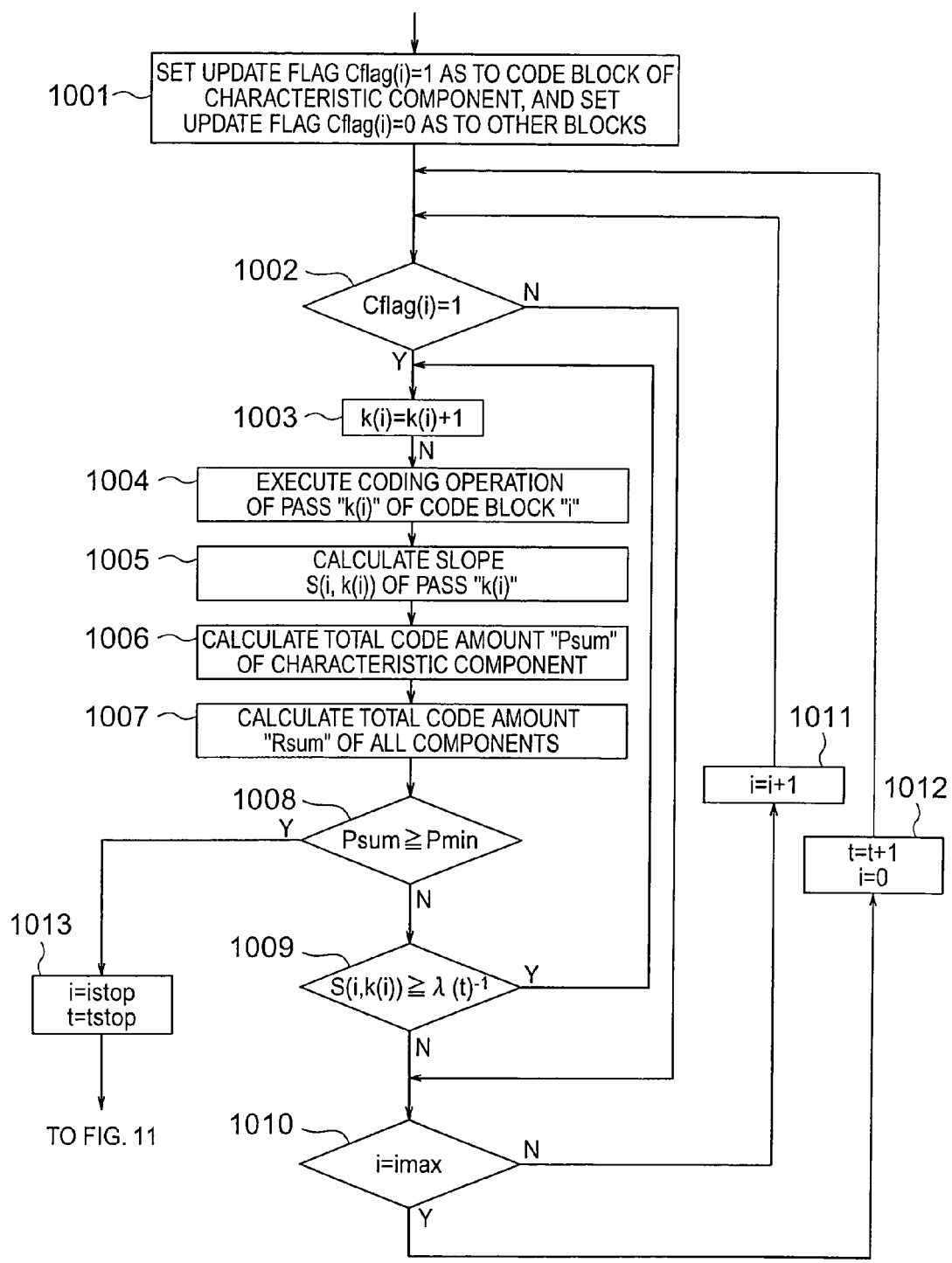
FIG. 10 is a flow chart for showing process operations which are continued to those of FIG. 9.
Figure 11:
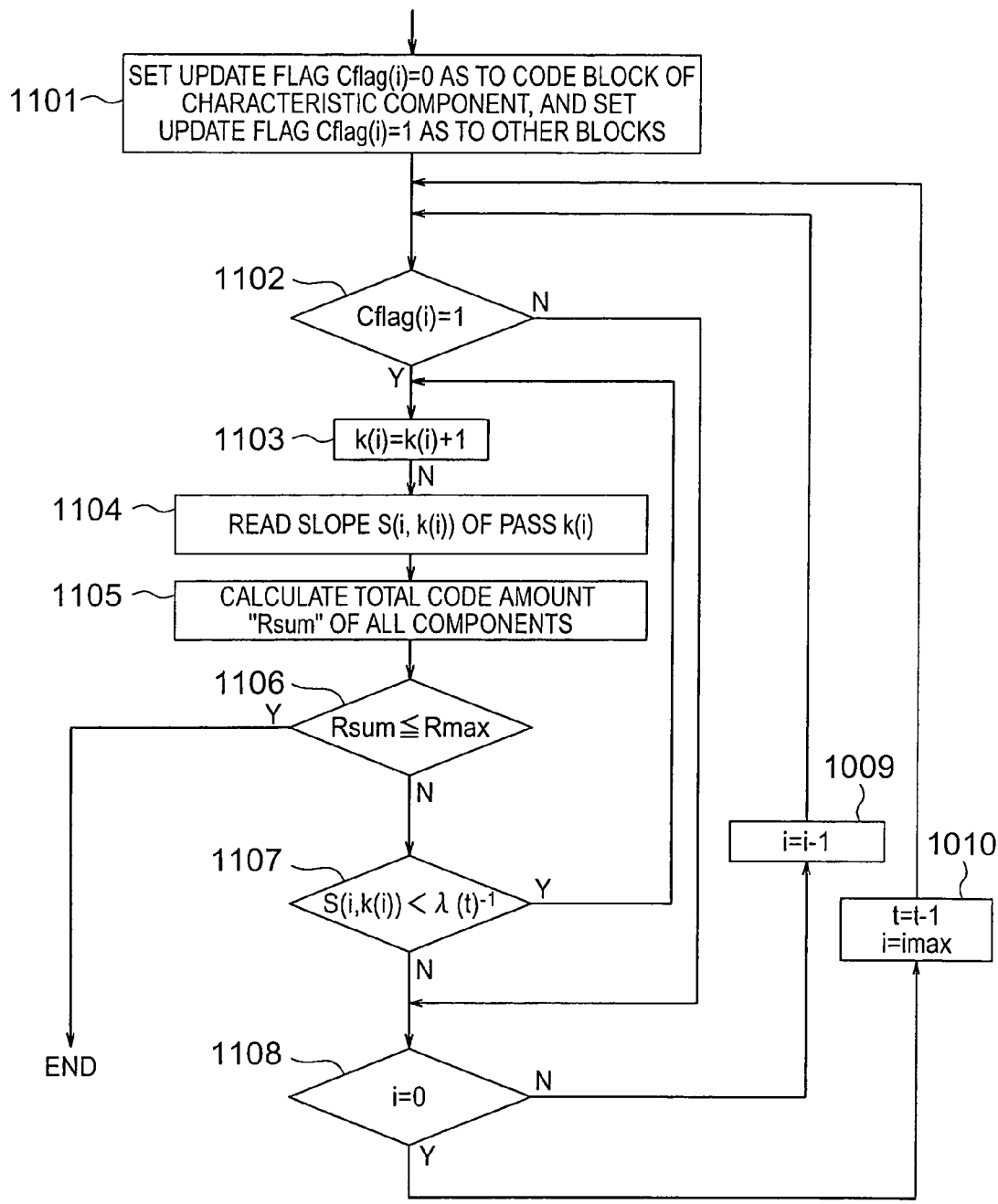
FIG. 11 is a flow chart for showing process operations which are continued to those of FIG. 10.

A method for determining a pass which should be coded will now be explained with reference to a flow chart shown in FIGS. 9 to 11, which corresponds to the operation contents of the coding pass conducting means 115. A candidate "λ(t)" for the rate control parameter is previously set as follows:

$$\lambda(t) = \{\lambda(0), \lambda(1), \lambda(2), ..., \lambda(tmax)\}$$
$$(\lambda(t) < \lambda(t+1))$$

Also, an initial value of an index "t" of the rate control parameter is assumed as t=0 (t=0 to tmax); an index "i" of the code block is assumed as i=0 (i=0 to imax); a counter "Rsum" of a total code amount is assumed as Rsum=0; a counter "Psum" of a total code amount of a specific component is assumed as Psum=0; a variable k(i) for storing a coding pass in each of the code blocks is assumed as k(i)=−1 (index of next pass which has skipped zero bit plane is assumed as 0, k(i)=−1 to kmax, and for the convenience of counter, initial value is assumed as k(i)=−1).

Although this memory is not illustrated in the block diagram, symbol "k(i)" indicates a variable which is stored for every code block; and the index "t" of the rate control parameter, the index "i" of the code block, the counter "Rsum" of the total code amount, and the counter "Psum" of the total code amount are assumed as variables which are commonly used in all of the code blocks.

Also, an update flag for indicating whether or not a coding process operation is further advanced in a certain code block is assumed as Cflag(i)=1 (i=0 to imax). It is assumed that the target total code amount "Rmax" and the minimum value "Pmin" of the specific component code amount are previously designated, and have been previously stored in the coding pass conducting means 115.

First, in a step 902, a coding pass which should be coded is set to "k(i)". In a step 903, a coding pass "k(i)" is coded. After the coding operation is carried out, in a step 904, a slope "S(i, k(i))" of the coding pass k(i) is calculated while using a relationship between the rates and the distortions which are stored in the rate distortion memory 113 such as the difference "ΔD" of the distortion "D" and that of the previous one, which is calculated by the distortion calculating means 111, and also, the code amount "ΔR" in the coding pass which is calculated by the code amount calculating means 112.

In a step 905, a total code amount "Psum" of the specific component is calculated. Although not shown in the drawing, information used to judge whether or not the respective code blocks belong to the specific component is stored inside the coding pass conducting means 115. Every time a code block of the specific component is coded, the code amount "ΔR" of the coding pass which should be coded is added to the total code amount "Psum" of the specific component so as to calculate a total code amount of the specific component by the coding pass conducting means 115. In a step 906, the code amount "ΔR" of the coding pass which should be coded is added to the total code amount "Rsum" so as to calculate a total code amount by the coding pass conducting means 115.

Next, in a step 907, a total code amount "Rsum" and a total code amount target value "Rmax" are compared. If the total code amount does not reach the target total code amount, then, in a step 911, a slope S(i, k) in the present coding pass is compared with "λ(t)$^{-1}$" for judging dimension. When the slope "S" is larger than the slope threshold value, a next pass is further coded (step 911→step 902). When the slope "S" is smaller than λ(t)$^-$, the code data of the coding pass is temporarily stored in the memory, the coding process operation of this code block is interrupted, the index "i" of the code block is incremented, and then, the process operation advances to a coding process operation for a next code block (step 911→step 912→step 913→step 902). Although not indicated in the flow chart, it should be noted that also in such a case where a coding pass is a final coding pass of the code block, the process operation advances to the process operation for the next code block.

Similarly, the coding process operation is carried out also with respect to the next code block until the slope becomes smaller than the slope threshold value of "$\lambda(t)^{-1}$". After this coding process operations have been carried out with respect to all of the code blocks, the index "t" of the parameter "$\lambda$" is incremented. The parameter "$\lambda$" is set to a next candidate, and then, the coding process operation is again carried out until the slope becomes smaller than the slope threshold value of "$\Delta(t)^{-1}$" (step 911→step 912→step 914→step 902). It should also be noted that in the step 914, there are some cases where even when the parameter $\lambda(t)$ is updated, the following relationship is established:

$$S(i, k(i)) < \lambda(t)^{-1}.$$

In other words, the parameter "$\lambda$" after being updated becomes larger than the slope in the previously coded pass. In this case, although not shown in the flow chart, the process operation jumps over the steps up to the step 912, and the coding process operation of this block passes, and then, advances to the coding process operation for the next code block.

Next, in a case where it is judged in a step 907 that Rsum>Rmax, the index of the final coding pass is assumed as k(i)−1 in order to remove the final coding pass of the present code block in a step 908, and a code amount "$\Delta R$" of the final coding pass is subtracted from the counter of the total code amount. In a step 909, a total code amount "Psum" of the specific component is compared with a minimum value "Pmin" of this specific component, and if the total code amount "Psum" of the specific component is equal to or larger than the minimum value "Pmin", then the coding process operation is accomplished.

In such a case where the total code amount "Psum" of the specific component is smaller than the minimum value "Pmin", the coding process operation is subsequently continued for only the code blocks belonging to the specific component until the total code amount "Psum" exceeds the minimum value "Pmin". In a step 910, an index "i" of the present code block and an index "t" of the rate control parameter "$\lambda$" are temporarily held in "istop" and "tstop". Then, the process operation advances to a step 1001 of FIG. 10, in which the update flag of the code block of the specific component is set to "1", and the update flags of other code blocks are set to "0". Since process operations defined from the subsequent step 1002 up to a step 1012 are substantially identical to the process operations defined from the step 902 up to the step 914 except that only the code blocks of the specific component are selected to be code blocks which should be coded, a detailed explanation thereof is omitted. While the coding process operation is executed, if it is judged in a step 1008 that the total code amount "Psum" of the specific component exceeds the minimum value "Pmin", then the process operation passes through a loop constructed of the step 1002 through the step 1012. As a result, as to the specific component, the coding pass which is outputted as a code stream is defined.

In the next stage, a coding pass is cut down until a total code amount becomes a target value in code blocks other than the specific component. In order to return the rate control parameter and the index of the code block to be coded to such a stage that the coding process operation of the code block of the specific component is stopped, the index of the rate control parameter "$\lambda$" held in the step 1013 and the index of the code block are set to "t" and "i", respectively. Then, the process operation advances to FIG. 11, and in a step 1101, the update flag of the code block of the specific component is set to 0, and the update flags of the code blocks other than the specific component are set to 1. From this stage, the coding passes are cut down in a scanning sequence which is opposite to that of when the coding process operation advances until a total code amount "Rsum" of all of the components becomes equal to or smaller than the target value "Rmax".

First, in a step 1102, an update flag for indicating whether or not the coding process operation should be further advanced in a certain code block is assumed as Cflag(i)=1 (i=0 to imax). In a step 1103, one of the coding passes is deleted, and in a step 1104, a slope of the deleted coding pass is read out from the rate distortion memory 113 (since coding process operation has already been accomplished, coding process operation is not required). In a step 1105, a total code amount "Rsum" of all of the components at this stage is calculated. In a step 1106, the calculated total code amount "Rsum" is compared with the target value "Rmax", and if the total code amount "Rsum" is equal to or smaller than the target value "Rmax", then the process operation for determining the coding pass at this stage is ended. Information "k(i)" for indicating which pass is outputted as a code stream in each of the code blocks is sent to the code data extracting means 106.

In a case where the total code amount "Rsum" is larger than the target value "Rmax", in a step 1107, a comparison is made between a slope "S (i, k)" in the present coding pass and "$\lambda(t)^{-1}$". If the slope "S" is smaller than $\lambda(t)^{-1}$, then the process operation returns to the step 1103 in which a next pass is further coded. If the slope "S" becomes equal to or larger than "$\lambda(t)^{-1}$", then the index "i" of the code block is decremented via the step 1108 and the step 1109, and the process operation returns to the step 1102 so as to advance to a process operation for a next code block. Although not shown in the flow chart, even in such a case where a coding pass corresponds to a first coding pass of the relevant code block, it is assumed that the process operation advances to a process operation for the next code block. Similarly, even in the next code block, the process operation is carried out until the slope "S" becomes equal to or larger than $\lambda(t)^{-1}$. After this process operation has been carried out with respect to all of the code blocks, in a step 1110, the index "t" of the rate control parameter "$\lambda$" is decremented so as to increase the slope threshold value; the parameter "$\lambda$" is set to a next candidate; and scan code blocks other than that of the specific component.

Next, FIG. 12 indicates an example of how the parameter "$\lambda$" is changed so as to determine a rate distribution. In this example, a coding process operation is carried out assuming that image data constructed of 3 color components (RGB) is a target value of a total code amount Rmax=100. Total code amounts of the respective R, G, and B color components are assumed as R0, R1, and R2, and a minimum value "Pmin" of a code amount is 30.

First, the coding process operation starts from $\lambda^{-1}$=100, and is continuously carried out until the slope "S" becomes S<$\lambda^{-1}$=100 in each of the code blocks. At such a stage that this coding process operation is carried out with respect to all of the code blocks, the total code amount "Rsum" is equal to 85. Since "Rsum" is still smaller than the target total code amount, the parameter "$\lambda$" is decrement by 1 stage, and thus becomes $\lambda^{-1}$=90. Again, the coding process operation is continuously carried out until the slope "S" becomes S<$\lambda^{-1}$=90 in each of the code blocks. At such a stage that this coding process operation has been carried out with respect to all of the code blocks, the total code amount "Rsum" was equal to 92.

Since "Rsum" is still smaller than the target total code amount, when the parameter "λ" is decremented by 1 stage to become $\lambda^{-1}=80$, at such a stage that a certain coding pass is coded, a total code amount is equal to or smaller than a target value 100, and becomes 99 in maximum. However, since a code amount of the specific component is smaller than a minimum value thereof, the coding process operation is subsequently continued with respect only to the code blocks belonging to the specific component. While the parameter "λ" is set as $\lambda^{-1}=80$, a code amount of the specific component is 22 at such a stage that all of the code blocks of the specific components are coded. In the table, numeral values which are not changed since the updating operation is stopped are represented in a mesh manner.

Since the code amount of the specific component has not yet become equal to a minimum value of 30, the parameter "λ" is decremented by 1 stage to become $\lambda^{-1}=70$, and the coding process operation is continued. At such a stage that this coding process operation is carried out with respect to all of the code blocks belonging to the specific component, a total code amount of the specific component is Psum=25. Since "Psum" is still smaller than the minimum value of 30, when the parameter "λ" is furthermore decremented by 1 stage to become $\lambda^{-1}=80$, the total code amount of the specific component exceeded the minimum value of 30 through halfway, so that the coding process operation of the specific component at this stage is accomplished.

Subsequently, a coding pass which should be cut down in the code blocks except for the specific component is determined. When such coding passes whose slopes are smaller than $\lambda^{-1}=80$ in the code blocks except for the specific component are cut down, a total code amount is 108. Since this total code amount is larger than the total target code amount of 100, while the parameter "λ" is incremented by 1 stage to be set as $\lambda^{-1}=90$ for the coding pass to be cut down, a total code amount became 104. Since this total code amount is still larger than the total target code amount of 100, while the parameter "λ" is incremented by 1 stage to be set as $\lambda^{-1}=100$ for the coding pass to be cut down, a total code amount became smaller than the target value of 100 through halfway, so the process operation is ended at this time. Since the above-explained process operations are carried out, the coding passes which should be outputted as the code data in all of the code blocks are determined, and the code amounts to be allocated to the respective R, G, and B color components are given as 31, 34, and 34, respectively, whereas the total code amount becomes 99.

In Embodiment 2, the monitoring operation is performed as to whether or not the code amount of the specific component becomes equal to or larger than the minimum code amount so as to restrict the code amount of the specific component. However, the present invention is not necessarily limited to the code amount. Alternatively, for example, a coding distortion of the specific component may be monitored in order that the coding distortion of the specific component is restricted to be equal to or smaller than a designated coding distortion value. Also, in Embodiment 2, the specific component is selected to one sort. Alternatively, a plurality of specific components may be set, and a minimum value of these specific components may be set. For example, in image data constituted by three color (RGB) components, a total code amount of each of these three color components may be alternatively monitored so as to restrict the total code amounts of the respective three color components.

Also, in Embodiment 2, the code amount of the specific component is restricted so that the code amount of the specific component becomes equal to or larger than the minimum code amount. Alternatively, while the coding method of Embodiment 2 may be combined with the coding method executed so that the code amount of the specific component becomes equal to or smaller than the maximum code amount as explained in Embodiment 1, the code amount of the specific component may be controlled such that the code amount of the specific component becomes equal to or larger than the minimum code amount, and further, may become equal to or smaller than the maximum code amount. To realize this alternative method, similar to the process operation defined in the step 707 of FIG. 7, a judgement is made as to whether or not the code amount of the specific component exceeds the maximum value between the step 906 and the step 907 of FIG. 9. When the code amount of the specific component exceeds the maximum value, such process operations similar to those of the step 708 and the step 709 of FIG. 7 are carried out. Subsequently, a coding process operation is not executed with respect to the code blocks belonging to the specific component.

In accordance with a method for simply minimizing the mean square error of the entire screen explained as the conventional technique, there are some cases where the code amount distribution of the specific component is extremely decreased, and thus, the subjective image quality is deteriorated. As previously explained, if it is guaranteed that the code amount of the specific component is equal to or larger than the minimum value, then it is possible to avoid such a condition that the image quality of the specific component is extremely deteriorated, which may improve the image quality.

Also, in a case where the code amount of the specific component is restricted based on the method for executing the convergence calculation indicated as the conventional technique, if the code amount of the specific component does not reach the minimum value, then the convergence calculation for seeking the proper slope "λ" is again required. In the above-explained conventional convergence calculation, after all of the coding passes are coded, the slope "λ" capable of satisfying the target total code amount is searched by executing the convergence calculation. In contrast to the conventional method, in Embodiment 2, the code amount of the specific component may be merely monitored in order to determine whether or not the coding process operation with respect to each of the coding passes is continued. As a result, the coding method of Embodiment 2 may also have a merit that the coding process amount is reduced.

What is claimed is:

1. An image coding apparatus, comprising:
   an entropy coding means for splitting a two-dimensional signal into a plurality of code blocks, for resolving the code blocks to bit planes, for splitting each of the bit planes into one or more pieces of coding passes, and for coding the coding pass based on control information for every coding pass to output code data;
   a code memory for storing thereinto the code data outputted from the entropy coding means;
   a rate control information extracting means for judging both a continuation and an end of the coding pass based on a calculation result of a distortion and a code amount, which are required in a rate control; and
   a code data extracting means for extracting the code data up to the coding end pass from the code memory based on the control information extracted from the rate control information extracting means, and for outputting the extracted code data as a code stream, wherein the rate control information extracting means includes:

a distortion calculating means for calculating a distortion which is produced by coding each of the coding passes;

a code amount calculating means for calculating a code amount of each of the coding passes;

a slope calculating means for calculating a slope based on a relationship between a distortion and a code amount in each of the code blocks from both the distortion calculated from the distortion calculating means and the code amount calculated from the code amount calculating means; and a coding pass conducting means for outputting the control information to both the entropy coding means and the code data extracting means, while the control information controls each of the coding operation based on the slope, a total code amount of all components, and a total code amount of a specific component so that the total code amount of the all components is equal to or smaller than a target code amount, and the total code amount of the specific component is equal to or smaller than a predetermined maximum value, wherein:

the coding pass conducting means codes such a coding pass that the slope exceeds a predetermined slope threshold value;

if the total code amount of the all components does not reach the target code amount, the coding pass conducting means repeatedly controls a process operation by that the predetermined slope threshold value is decreased, and a coding pass which has not yet coded before the slope threshold value is decreased is furthermore coded until the total code amount of the all components reaches the target code amount; and if a total code amount of the specific component designated in a halfway of the coding operation exceeds the maximum value, the coding pass conducting means controls the coding operation so that the coding operation as to a code block belonging to the specific component is not subsequently carried out.

2. An image coding apparatus, comprising:

an entropy coding means for splitting a two-dimensional signal into a plurality of code blocks, for resolving the code blocks to bit planes, for splitting each of the bit planes into one or more pieces of coding passes, and for coding the coding pass based on control information for every coding pass to output code data;

a code memory for storing thereinto the code data outputted from the entropy coding means;

a rate control information extracting means for judging both a continuation and an end of the coding pass based on a calculation result of a distortion and a code amount, which are required in a rate control; and a code data extracting means for extracting the code data up to the coding end pass from the code memory based on the control information extracted from the rate control information extracting means, and for outputting the extracted code data as a code stream, wherein the rate control information extracting means includes:

a distortion calculating means for calculating a distortion which is produced by coding each of the coding passes;

a code amount calculating means for calculating a code amount of each of the coding passes;

a slope calculating means for calculating a slope based on a relationship between a distortion and a code amount in each of the code blocks from both the distortion calculated from the distortion calculating means and the code amount calculated from the code amount calculating means; and a coding pass conducting means for outputting the control information to both the entropy coding means and the code data extracting means, while the control information controls each of the coding operation based on the slope, a total code amount of all components, and a total code amount of a specific component so that the total code amount of the all components is equal to or smaller than a target code amount, and the total code amount of the specific component is equal to or smaller than a predetermined maximum value, wherein:

the coding pass conducting means codes such a coding pass that the slope exceeds a predetermined slope threshold value;

if the total code amount of the all components does not reach the target code amount, the coding pass conducting means repeatedly controls a process operation by that the predetermined slope threshold value is decreased, and a coding pass which has not yet coded before the slope threshold value is decreased is furthermore coded until the total code amount of the all components reaches the target code amount;

if the total code amount of the specific component does not reach a predetermined minimum value at a stage when the total code amount of the all components reaches the target code amount, the coding pass conducting means controls to further continue the coding operation for only a code block belonging to the specific component until the total code amount of the specific component exceeds the minimum value; and thereafter, the coding pass conducting means performs such a process operation that the slope threshold value is increased only as to a code block except for the specific component and a coding pass which does not reach the slope threshold value is deleted from the code stream until the total code amount of the all components becomes smaller than the target code amount, and the coding pass conducting means determines a coding pass at a time instant when the total code amount of the all components becomes smaller than the target code amount as a final output pass.

3. An image coding apparatus, comprising:

an entropy coding means for splitting a two-dimensional signal into a plurality of code blocks, for resolving the code blocks to bit planes, for splitting each of the bit planes into one or more pieces of coding passes, and for coding the coding pass based on control information for every coding pass to output code data;

a code memory for storing thereinto the code data outputted from the entropy coding means;

a rate control information extracting means for judging both a continuation and an end of the coding pass based on a calculation result of a distortion and a code amount, which are required in a rate control; and a code data extracting means for extracting the code data up to the coding end pass from the code memory based on the control information extracted from the rate control information extracting means, and for outputting the extracted code data as a code stream, wherein the rate control information extracting means includes:

a distortion calculating means for calculating a distortion which is produced by coding each of the coding passes;

a code amount calculating means for calculating a code amount of each of the coding passes;

a slope calculating means for calculating a slope based on a relationship between a distortion and a code amount in each of the code blocks from both the distortion calculated from the distortion calculating means and the code amount calculated from the code amount calculating means; and a coding pass conducting means for outputting the control information to both the entropy coding means and the code data extracting means, while the control information controls each of the coding operation based on the slope, a total code amount of all components, and a total code amount of a specific component so that the total code amount of the all components is equal to or smaller than a target code amount, and the total code amount of the specific component is equal to or smaller than a predetermined maximum value, wherein:

the coding pass conducting means codes such a coding pass that the slope exceeds a predetermined slope threshold value;

if the total code amount of the all components does not reach the target code amount, the coding pass conducting means repeatedly controls a process operation by that the predetermined slope threshold value is decreased, and a coding pass which has not yet coded before the slope threshold value is decreased is furthermore coded until the total code amount of the all components reaches the target code amount;

if a total code amount of the specific component designated in a halfway of the coding operation exceeds the maximum value, the coding pass conducting means controls the coding operation so that the coding operation as to a code block belonging to the specific component is not subsequently carried out;

if the total code amount of the specific component does not reach a predetermined minimum value at a stage when the total code amount of the all components reaches the target code amount, the coding pass conducting means controls to further continue the coding operation for only a code block belonging to the specific component until the total code amount of the specific component exceeds the minimum value; and thereafter, the coding pass conducting means performs such a process operation that the slope threshold value is increased only as to a code block except for the specific component and a coding pass which does not reach the slope threshold value is deleted from the code stream until the total code amount of the all components becomes smaller than the target code amount, and the coding pass conducting means determines a coding pass at a time instant when the total code amount of the all components becomes smaller than the target code amount as a final output pass.

4. An image coding method, comprising:

splitting, by an entropy coding means, a two-dimensional signal into a plurality of code blocks, for resolving the code blocks to bit planes, for splitting each of the bit planes into one or more pieces of coding passes, and for coding the coding pass based on control information for every coding pass to output code data;

storing into a code memory the outputted code data;

judging, by a rate control information extracting means, both a continuation and an end of the coding pass based on a calculation result of a distortion and a code amount, which are required in a rate control;

extracting, by a code data extracting means, the code data up to the coding end pass from the code memory based on the extracted control information from the rate control information extracting means, and outputting the extracted code data as a code stream, wherein extracting includes:

calculating a distortion which is produced by coding each of the coding passes;

calculating a code amount of each of the coding passes;

calculating a slope based on a relationship between a distortion and a code amount in each of the code blocks from both the calculated distortion and the calculated code amount;

outputting the control information to both the entropy coding means and the code data extracting means, while the control information controls each of the coding operation based on the slope, a total code amount of all components, and a total code amount of a specific component so that the total code amount of the all components is equal to or smaller than a target code amount, and the total code amount of the specific component is equal to or smaller than a predetermined maximum value; and the method further comprising:

coding such a coding pass that the slope exceeds a predetermined slope threshold value;

if the total code amount of the all components does not reach the target code amount, repeatedly controlling a process operation by that the predetermined slope threshold value is decreased, and a coding pass which has not yet coded before the slope threshold value is decreased is furthermore coded until the total code amount of the all components reaches the target code amount; and if a total code amount of the specific component designated in a halfway of the coding operation exceeds the maximum value, controlling the coding operation so that the coding operation as to a code block belonging to the specific component is not subsequently carried out.

5. An image coding method, comprising:

splitting, by an entropy coding means, a two-dimensional signal into a plurality of code blocks, for resolving the code blocks to bit planes, for splitting each of the bit planes into one or more pieces of coding passes, and for coding the coding pass based on control information for every coding pass to output code data;

storing into a code memory the outputted code data;

judging, by a rate control information extracting means, both a continuation and an end of the coding pass based on a calculation result of a distortion and a code amount, which are required in a rate control;

extracting, by a code data extracting means, the code data up to the coding end pass from the code memory based on the extracted control information from the rate control information extracting means, and outputting the extracted code data as a code stream, wherein extracting includes:

calculating a distortion which is produced by coding each of the coding passes;

calculating a code amount of each of the coding passes;

calculating a slope based on a relationship between a distortion and a code amount in each of the code blocks from both the calculated distortion and the calculated code amount;

outputting the control information to both the entropy coding means and the code data extracting means, while the control information controls each of the coding operation based on the slope, a total code amount of all components, and a total code amount of a specific component so that the total code amount of the all components is equal to or smaller than a target code amount, and the total code amount of the specific component is equal to or smaller than a predetermined maximum value; and the method further comprising:

coding such a coding pass that the slope exceeds a predetermined slope threshold value;

if the total code amount of the all components does not reach the target code amount, repeatedly controlling a process operation by that the predetermined slope threshold value is decreased, and a coding pass which has not yet coded before the slope threshold value is decreased is furthermore coded until the total code amount of the all components reaches the target code amount;

if the total code amount of the specific component does not reach a predetermined minimum value at a stage when the total code amount of the all components reaches the target code amount, controlling to further continue the coding operation for only a code block belonging to the specific component until the total code amount of the specific component exceeds the minimum value; and thereafter, performing such a process operation that the slope threshold value is increased only as to a code block except for the specific component and a coding pass which does not reach the slope threshold value is deleted from the code stream until the total code amount of the all components becomes smaller than the target code amount, and determining a coding pass at a time instant when the total code amount of the all components becomes smaller than the target code amount as a final output pass.

6. An image coding method, comprising:

splitting, by an entropy coding means, a two-dimensional signal into a plurality of code blocks, for resolving the code blocks to bit planes, for splitting each of the bit planes into one or more pieces of coding passes, and for coding the coding pass based on control information for every coding pass to output code data;

storing into a code memory the outputted code data;

judging, by a rate control information extracting means, both a continuation and an end of the coding pass based on a calculation result of a distortion and a code amount, which are required in a rate control;

extracting, by a code data extracting means, the code data up to the coding end pass from the code memory based on the extracted control information from the rate control information extracting means, and outputting the extracted code data as a code stream, wherein extracting includes:

calculating a distortion which is produced by coding each of the coding passes;

calculating a code amount of each of the coding passes;

calculating a slope based on a relationship between a distortion and a code amount in each of the code blocks from both the calculated distortion and the calculated code amount;

outputting the control information to both the entropy coding means and the code data extracting means, while the control information controls each of the coding operation based on the slope, a total code amount of all components, and a total code amount of a specific component so that the total code amount of the all components is equal to or smaller than a target code amount, and the total code amount of the specific component is equal to or smaller than a predetermined maximum value; and the method further comprising:

coding such a coding pass that the slope exceeds a predetermined slope threshold value;

if the total code amount of the all components does not reach the target code amount, the repeatedly controlling a process operation by that the predetermined slope threshold value is decreased, and a coding pass which has not yet coded before the slope threshold value is decreased is furthermore coded until the total code amount of the all components reaches the target code amount;

if a total code amount of the specific component designated in a halfway of the coding operation exceeds the maximum value, controlling the coding operation so that the coding operation as to a code block belonging to the specific component is not subsequently carried out;

if the total code amount of the specific component does not reach a predetermined minimum value at a stage when the total code amount of the all components reaches the target code amount, controlling to further continue the coding operation for only a code block belonging to the specific component until the total code amount of the specific component exceeds the minimum value; and thereafter, performing such a process operation that the slope threshold value is increased only as to a code block except for the specific component and a coding pass which does not reach the slope threshold value is deleted from the code stream until the total code amount of the all components becomes smaller than the target code amount, and determining a coding pass at a time instant when the total code amount of the all components becomes smaller than the target code amount as a final output pass.

* * * * *